United States Patent
Kawase

[11] Patent Number: 5,903,414
[45] Date of Patent: May 11, 1999

[54] MAGNETIC HEAD UTILIZING MAGNETIC IMPEDANCE EFFECT

[75] Inventor: Masahiro Kawase, Higashimatsuyama, Japan

[73] Assignee: Canon Denshi Kabushiki Kaisha, Saitama-ken, Japan

[21] Appl. No.: 08/854,061

[22] Filed: May 8, 1997

[30] Foreign Application Priority Data

May 10, 1996 [JP] Japan ................................. 8-115836
Apr. 3, 1997 [JP] Japan ................................. 9-084748

[51] Int. Cl.$^6$ .................................................. G11B 5/33
[52] U.S. Cl. .................................................. 360/110
[58] Field of Search ................................. 360/110, 119, 360/122, 124

[56] References Cited

U.S. PATENT DOCUMENTS

| | | | |
|---|---|---|---|
| 4,527,202 | 7/1985 | Ohta | 360/118 X |
| 4,593,332 | 6/1986 | Akiyama et al. | 360/111 |
| 5,654,844 | 8/1997 | Ohmori et al. | 360/119 X |

FOREIGN PATENT DOCUMENTS

| | | |
|---|---|---|
| 7-181239 | 7/1995 | Japan . |
| 8-075835 | 4/1996 | Japan . |
| 8-273113 | 10/1996 | Japan . |
| 9-113590 | 2/1997 | Japan . |

OTHER PUBLICATIONS

*J. of Applied Physics* (Nov. 1994), vol. 76, No. 10, II, p. 6.

Primary Examiner—John H. Wolff
Attorney, Agent, or Firm—Robin, Blecker & Daley

[57] ABSTRACT

A magnetic head for reproducing digital magnetic recording information using a MI head, which is a magnetic detection element utilizing magnetic impedance effect, the magnetic recording medium 10 is magnetized alternatively, in the opposite direction along a relative movement direction relative to the magnetic head, the boundary 11 of magnetization is a straight line normal to the relative movement direction, and the MI element 12 opposes in parallel with the surface of the recording medium 10. In a surface in parallel with the surface of the element 12, the MI element is positioned so that its longitudinal direction is inclined by an angle θ relative to the direction of the boundary 11 of magnetization. A high frequency current is applied via terminals 13A and 13B to obtain a reproduced signal through the magnetic impedance effect.

8 Claims, 10 Drawing Sheets

$\theta' > \theta$

MAGNETIC HEAD UTILIZING MAGNETIC IMPEDANCE EFFECT

BACKGROUND OF THE INVENTION

1. Field of the Invention

The present invention relates to a magnetic head for reproducing magnetically recorded information, and more particularly, to a magnetic head, utilizing magnetic impedance effect, to reproduce digital information which is magnetically recorded.

2. Brief Description of the Related Art

According to high density integration of recent digital techniques, which is progressed in the external storing device of a computer, such as hard disk devices or digital compact cassette tape recorders, the decrease of S/N ratio due to a decrease of the track width or decrease of speed is caused in a conventional induction-type magnetic head, and therefore a magnetic resistance element (hereinafter, referred to MR element) is utilized as a reproducing head.

The MR element, which is free from speed dependency on the magnetic recording medium, is suitable for deriving the output at low speed, however it has a resistance change of as low as several percent. It is therefore desired to develop elements that are further improved in sensitivity in order to comply with future high density designs.

In this connection, a system of this type that is particularly remarkable has been disclosed in recent years, for example, in Japanese laid-open patent publication No. 7-181239/1995 which describes a magnetically detectable head utilizing magnetic impedance effect (hereinafter, referred to "MI element").

The "magnetic impedance effect" referred herein relates to a phenomenon that, a high frequency current of a MHz (mega Hertz) band is caused to flow through a magnetic material. The impedance of the material changes according to the external magnetic field, and accordingly the amplitude of the terminal voltage of the magnetic material can vary by as high as tens % within a minute magnetic field of as low as several gauss. It is expected, when such a MI element is applied to a magnetic head, an excellent performance which has never seen in the past would be obtained.

However, in the case that a MI element is simply utilized for a magnetic head, there would be caused the hereinafter described problems.

Since a MI element has normally a property that it is sensitive in the longitudinal direction of the element, it is necessary to approach or engage with one end of the element with the recording medium to hence draw the magnetic flux to the interior of the element. For this purpose, for example, as shown in FIG. 17, if a MI element 102 is positioned so as to extend perpendicular to magnetic medium 100, the magnetic flux concentrates at the end tip of MI element 102, and rapidly decreases as deviated from the medium 100. Thus, the region having an increased impedance change concentrates at the end tip of MI element 102, and hence the sufficient sensitivity of MI element 102 as a whole cannot be attained. Alternatively, although, by decreasing the length of MI element 102, the efficiency of impedance change might be increased, yet the increase of demagnetizing field in the direction of detection, that is, in the longitudinal direction and the lowering of impedance are caused, thereby with still no improvement in sensitivity being achieved.

SUMMARY OF THE INVENTION

The object of the present invention is to provide a magnetic head for reproducing digital magnetic recording information constructed by using a MI element, in which magnetic impedance effect is sufficiently utilized to provide high sensitivity and excellent reproduction and to meet with high density of recording.

For solving the aforementioned problems, the present invention is to provide a magnetic head, which is magnetized discontinuously in one direction or continuously in the alternative direction, the digital signal mentioned above is reproduced from a magnetic recording medium, wherein the boundary of the adjacent oppositely magnetized regions is formed as a straight line along a direction intersecting the aforementioned relative displacement direction, and the magnetic head comprises a MI element formed as a straight line as a whole, the above-mentioned MI element is located to oppose the surface of the medium in parallel therewith, and the longitudinal portions of the element is oriented to be shifted by a predetermined amount of angle with reference to the direction of magnetization of the magnetic medium, and as a result, the structure has been selected so as to enable to detect an external magnetic field from the recording medium to obtain a reproduced signal.

The above and other objects and features of this invention will become apparent from the following detailed description of embodiments thereof taken in connection with the accompanying drawings.

DETAILED DESCRIPTION OF THE PREFERRED EMBODIMENTS

Figure 1A:
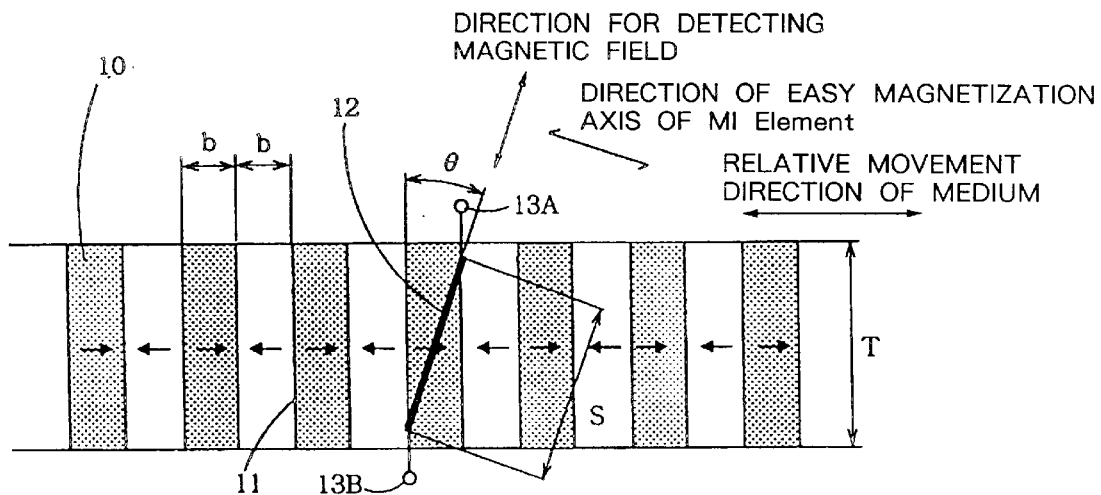
FIGS. 1A and 1B each is a view illustrating a scheme of and a positional relationship between a MI element and a magnetic recording medium in the direction toward the surface and along a section of the medium, respectively, according to a first embodiment of the invention.

In describing hereinafter the embodiments of the invention referring now to the drawings, wherein like reference numerals designate identical or corresponding parts throughout the several views by the same and common reference numerals, and therefore the description is omitted for each of parts in a second embodiment and thereafter, which is common with that in a first embodiment.

Embodiment 1

Referring now to the drawings, FIG. 1A to FIG. 5 illustrate the first embodiment according to the present invention.

Figure 1B:
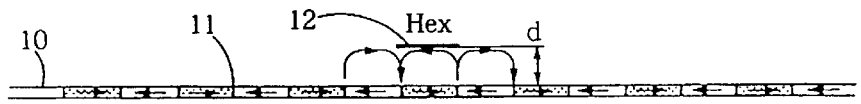
Figure 2:
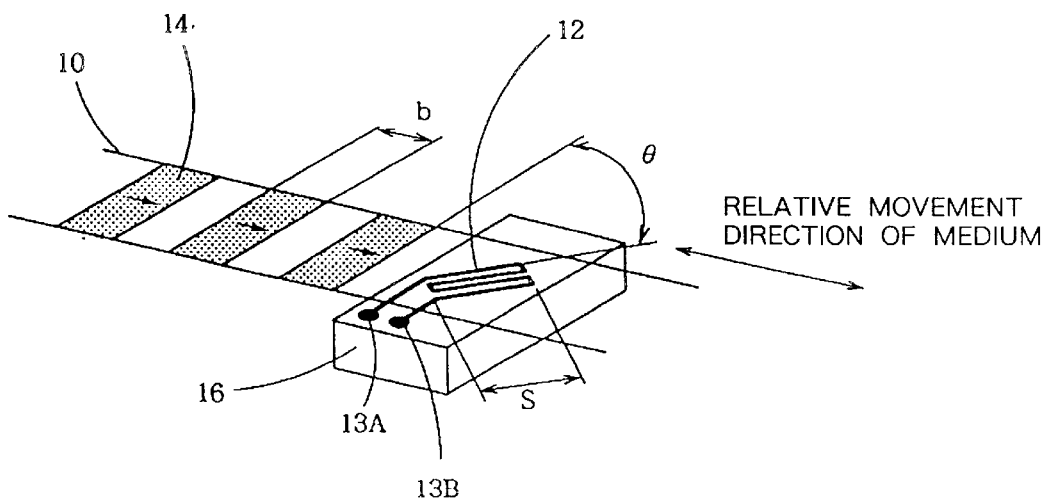
FIG. 2 is a perspective view of the first embodiment.

FIGS. 1A and 1B are fundamental illustrations of the first embodiment, wherein FIG. 1A shows the positional relationship between a MI element and a magnetic recording medium (hereinafter, sometimes abbreviated as simply "medium") in the direction in parallel to the surface of the medium and FIG. 1B shows the same, but in the direction along a vertical section of the medium A magnetic recording medium 10 is formed, for example, as a magnetic tape, and moves along the longitudinal direction of medium 10 formed in a magnetic head relative to MI element 11 shown as the lateral direction in FIG. 1A. Either the medium 10 or magnetic element may be moved relative to the other. The medium 10 is magnetized alternatively and continuously in the opposite direction, and, alternatively, magnetized discontinuously in one direction, with the predetermined shortest recording bit length b as a unit, as shown in FIG. 2 thereafter, wherein the boundary line 11 is formed as a straight line perpendicular to the length direction of medium 10. Also, the direction of line 11 may be a somewhat angled direction relative to the aforementioned perpendicular direction.

The shortest recording bit length herein is defined in the relative movement direction of medium 10, and is the shortest length of the recorded region as a unit in order to express each bit of the digital information (there are one or more kinds of length according to the modulation types for digital signals).

On the other hand, the MI element 12 is composed of a combined figure of straight lines formed of amorphous wire or highly permeability magnetic layer so as to have magnetic anisotropy in the manner that the direction of the easy magnetizable axis is perpendicular with reference to the longitudinal direction of the MI element, so that the detection sensitivity for an external magnetic field Hex is exhibited in the longitudinal direction, based on the magnetic impedance effect.

The MI element 12 is formed on the surface of a flat substrate made of a non-magnetic material such as glass, so as to be opposed in parallel relative to the surface (as its recording surface) of medium 10 with a predetermined spacing therebetween, and to be angled relative to the boundary line 11 of magnetization by a predetermined angle "theta" in a plane in parallel with the surface of the medium.

The purposes for providing inclination or angle include, one for achieving an increased length S of MI element 12 larger than the magnetized width of the shortest recording bit length b, and the other for extending both ends of MI element 12 to engage with the boundary of magnetized edges of the shortest recording bit length b, in order to draw the flux from the medium 10 into substantially the entire MI element 12.

Connected to the ends of MI element 12 are terminals 13A and 13B, which may be formed so as to extend from the MI element 12 with the same material, or formed as a separate conductive layer with a material different from that of MI element 12.

In a reproducing operation, a high frequency current is applied via terminals 13A and 13B to MI element 12, whereby, according to magnetic impedance effect, the impedance between terminal ends of MI element 12 varies in response to the external magnetic field of medium 10, so that the amplitude voltage between the terminal ends varies, and such varied voltage is derived and processed to obtain a reproduction signal. More specifically, a MI element is coupled as an oscillating circuit element in, for example, a Collpitz oscillator, and the change of an external magnetic field is derived as an amplitude voltage change of an output of the oscillator, which output is subjected to detection or like process to obtain a reproduced signal.

According to the above-described embodiment, by angling the longitudinal direction of the MI element 12 relative to that of the magnetizing boundary line 11 of the medium 10 for increasing the length of MI element longer than the shortest recording bit length b, it is enabled to reduce the demagnetizing field of MI element itself. Also, since the magnetic field from the medium 10 is received by the entire MI element 12, it is improved in efficiency of impedance variation to provide a reproduction with high sensitivity.

Figure 3:
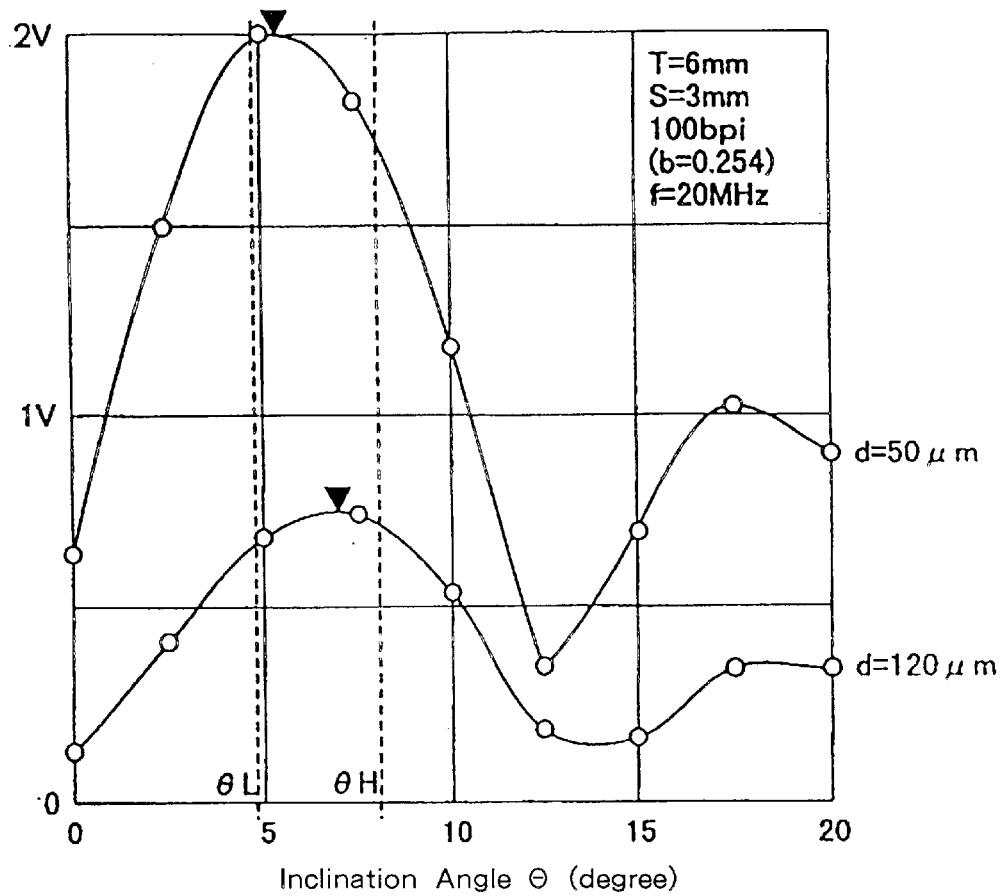
FIG. 3 is a graph illustrating the relationship of the inclination angle of a MI element with the terminal voltage.

In addition, FIGS. 2 and 3 illustrate the test results for obtaining data for setting the most preferable value of the inclination angle "theta" between the longitudinal direction of the element 12 and the boundary 11 of the medium 10.

First, FIG. 2 shows the arrangement for the test mentioned above. As shown in FIG. 2, formed on a surface of a sheet of paper was a recording track, having a width of T=6 mm and a density of 100 bpi (minimum recording bit length: 0.254 mm), by printing by means of discontinuous printing using a magnetic toner (Coersive force Hc=in the order of 100 Oe), and each discontinuously printed region 14 was magnetized in one direction along the relative movement direction, thus a magnetic recording medium 10 was prepared.

The MI element 12 was fabricated in the manner that a high permeability magnetic layer of Fe—Ta—C type is formed to a thickness of 2 microns on a flat rectangular glass substrate, and, since a pattern of a single line of 3 mm in length would be of low impedance, is formed to have a pattern width of 16 microns so that four patterns were folded in parallel with each other in the shape of meandering, thereby configured in entirely straight lines combined together. The spacing d between the medium 10 and MI element 12 was 50 microns for one and 120 microns for the other.

In measuring the output voltage, a bias magnetic field for obtaining sensitivity of MI element 12 was applied about 1 gauss, and a current of 20 MHz was allowed to flow via terminals 13A and 13B across the MI element 12, passed via a detector circuit, and thereafter the change of the terminal voltage was amplified by 750 times and measured. The result therefore is shown in FIG. 3.

Determined using the formula $\sin \theta = b/S = 0.254$ mm/3 mm, the numerically obtained most preferable angle $\theta$ cal is 4.8°, while, as found by the triangular symbols in FIG. 3, the preferable angle is shifted toward the side of positive angle in accordance with the increase of spacing d.

Figure 4A:
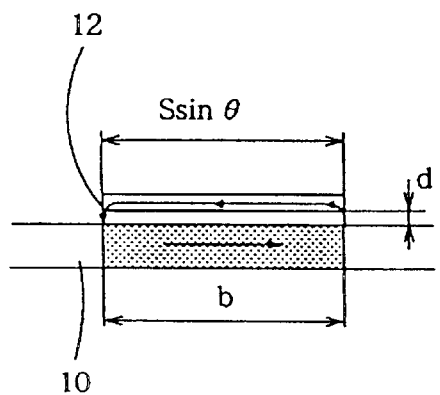
FIGS. 4A, B and C are illustrative views describing the inclination angle.
Figure 4B:
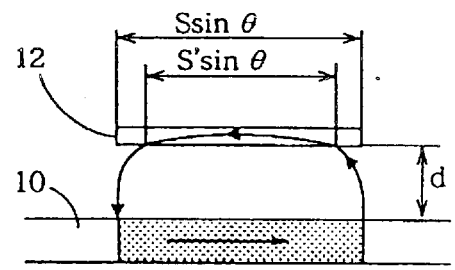
Figure 4C:
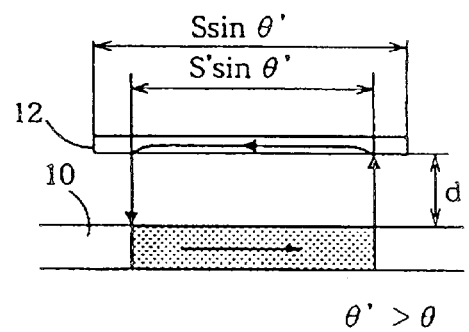

The reason therefore is described referring to FIGS. 4A, 4B and 4C as sectional views, wherein it is found, in the case that the spacing d between the medium 10 and MI element 12 is very close to zero, the most preferable angle is obtained when the length of the element 12, S×sin θ, is equal to the shortest recording bit length b as shown in FIG. 4A.

In contrast thereto, however, the spacing d increases, the magnetic flux produced from magnetization of the medium 10 is eased to enter inwardly from both sides of MI element 12, so that the effective length S' of the element 12 becomes shorter than the value S. Hence, the angle θ should be larger than its calculated value in order to coincide "S' sin θ" with b as shown in FIG. 4C.

Accordingly, when required to design a practical value for the angle, the most preferable value $\theta_{cal}$ is set as the lower limit, and the higher limit is substantially saturated at approximately 60% of the value S. Therefore, the values of angle to satisfy the following formula is the selectable range of inclination angle for the MI element, the formula is:

$$b = S' \times \sin \theta,$$

where 0.6 S is equal to or lower than S', but

S' is equal to or lower than S.

Hence, the lower limit $\theta_L$ and higher limit $\theta_H$, in the condition of "T=S cos θ, or >S cos θ", are represented, respectively, as follows:

$$\theta_L = \sin^{-1}(b/S), \text{ and } \theta_H = \sin^{-1}\{b/(0.6 \times S)\}$$

Under the condition shown in FIG. 3, the inclination angle θ is suitably established in the range of lower limit $\theta_L = 4.8°$, to the higher limit $\theta_H = 8.1°$, and the calculated data of the preferable range are also within the same range.

In the case of FIG. 2, the medium 10 has a plurality of separate regions each being magnetized in the same direction, and the same result is obtained also in the case of FIG. 1, in which each of the regions are magnetized alternatively in the opposite direction to each other along the relative movement direction.

Figure 5A:
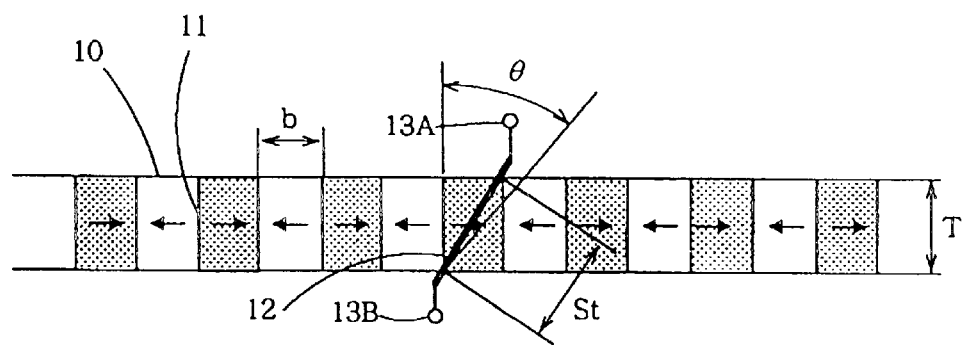
FIGS. 5A and 5B are descriptive illustrations of when the length of a MI element is longer than the track width.
Figure 5B:
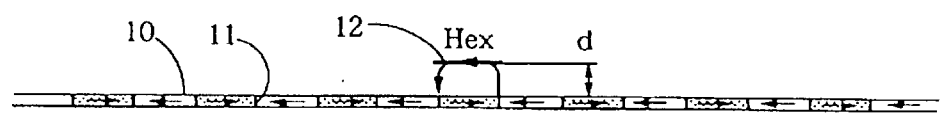

Also as shown in FIG. 5, the length S of MI element 12 is larger than the track width T of the medium 10, the region of MI element 2 outside the track is not operative, and therefore, the length S of the operative region of MI element 12 is conditionally limited by the relation "T=St cos θ", therefore, the value S may be replaced by "T/cos θ" in the formula described above. Hence, when T<S cos θ, the inclination angle θ of MI element is decided in the range from $\theta_L$ to $\theta_H$, obtained by the following formulas:

$$\theta_L = \tan^{-1}(b/T), \text{ and } \theta_H = \tan^{-1}(b/0.6T)$$

Embodiment 2

In the Embodiment 1 above, a single MI element is used to form a magnetic head. To further increase the S/N ratio to overcome external noise, it is preferable to use a pair of MI elements to differentially amplify each of the output voltages to produce a reproduced signal.

Figure 6:
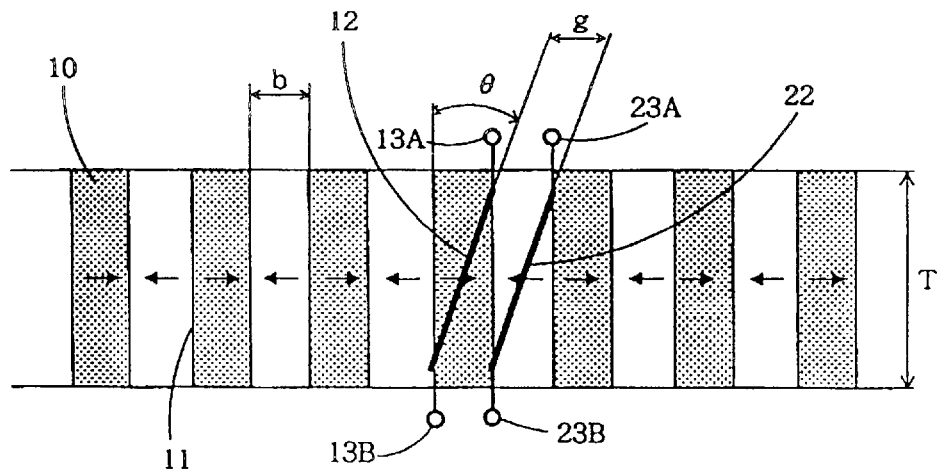
FIG. 6 is a schematic plan view of the second embodiment of the invention.

FIG. 6 s a schematic illustration of such an embodiment. As shown in FIG. 6, two MI elements 12 and 22 are side by side arranged away from each other by a predetermined spacing g (the distance between the centers) along the relative movement direction of the medium 10.

MI element 12 and 22 are opposed in parallel with a spacing d on the surface of the medium 10 in the same manner as those in Embodiment 1, so that the longitudinal direction of the element 12 and 22 are inclined by an angle θ relative to the direction of boundary 11.

The angle θ is, the same as Embodiment 1:

When T=or>(S cos θ), $$\theta_L = \sin^{-1}(b/S), \text{ and } \theta_H = \sin^{-1}\{b/(0.6 \times S)\}$$

and, when T<(S cos θ), $$\theta_L = \tan^{-1}(b/T), \text{ and } \theta_H = \tan^{-1}\{b/(0.6 \times T)\}.$$

and then, the value θ in the range of $\theta_L = \theta = \theta_H$, and $\theta_L < \theta < \theta_H$ is selected.

Also, the same construction is selected for MI elements 12 and 22 for providing for a performance that is the same as possible for the differential detection. It is also preferable to provide the spacing g which is equal to the shortest recording bit length b of the medium 10, wherein the g of either wider or narrower produces a peak shift or level lowering due to the interference caused between symbols.

Figure 7:
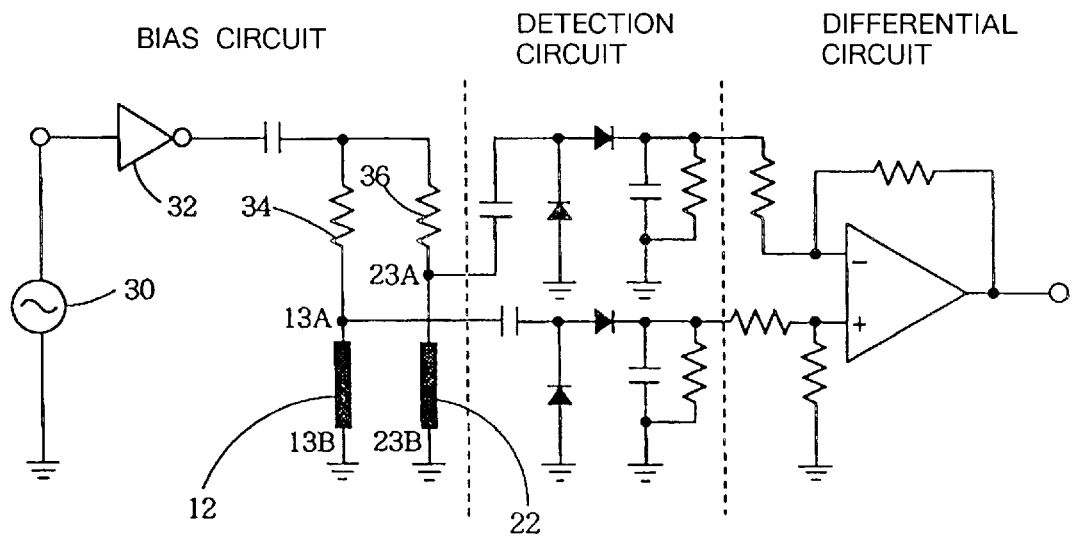
FIG. 7 is a schematic view of a circuit for obtaining a reproduced signal.

The circuit construction for obtaining a reproduced signal from the detection signal of MI elements is shown in FIG. 7, in which a high frequency current produced from an external oscillation source 30 of a bias circuit is applied to MI elements 12 and 22 across the terminals 13A and 23A via a buffer 32 and resistors 34 and 36 for impedance adjustment. Terminals 13B and 23B of MI elements 12 and 22 are grounded.

The circuit is basically a bridge circuit, wherein a detection output of MI elements is derived across the terminals 13A and 23A, each is passed via one of two systems of detection circuits each including a capacitor, a diode and a resistor, fed to a differential amplifier and there differentially amplified, and a reproduced output is obtained.

As a result, any same-phased noise such as external noise is removed through differential amplification, thereby improving the S/N ratio.

Figure 9:
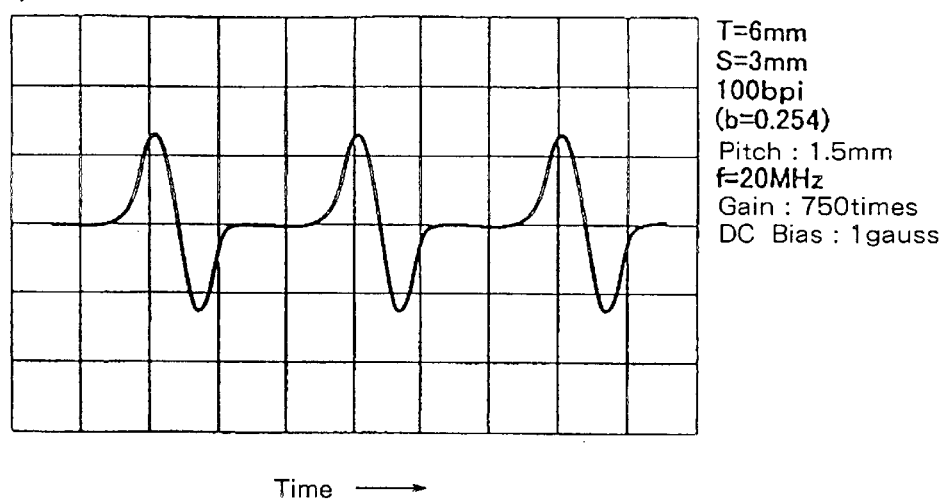
FIG. 9 is a graph illustrating the reproduced signal waveform.

FIG. 9 shows an example of the reproduced output waveform by the circuit in FIG. 7.

Figure 8:
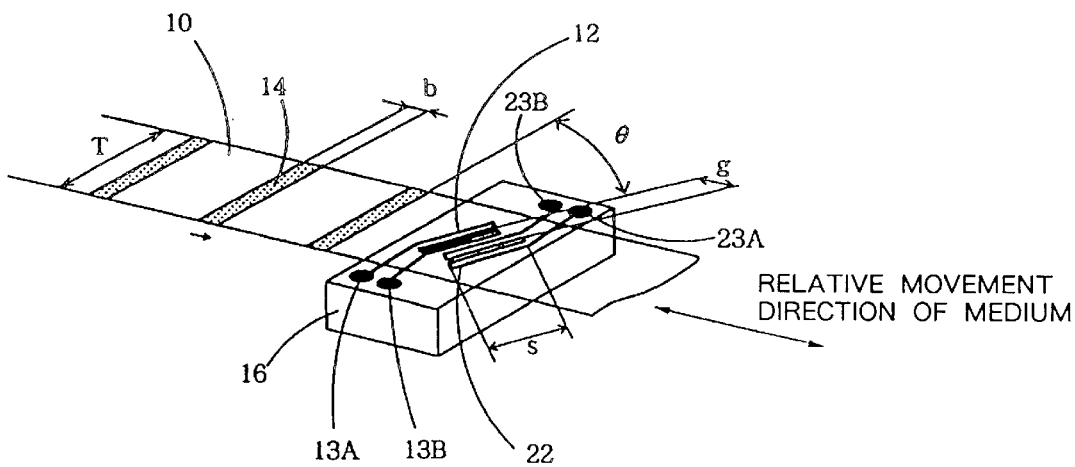
FIG. 8 is a perspective view of a specifically illustrated embodiment.

To prove the increased sensitivity, the recording medium 10 was formed as shown in FIG. 8 by printing by use of a magnetic toner having a minimized magnetic power in the extent of Hc=100 Oe, to form a recording pattern having a track width "T" of 6 mm, a line width b (shortest recording pitch length) of the printed region of 0.25 mm, and a pitch of the printed region 14 of 1.5 mm. The magnetizing direction is one direction along the longitudinal direction, that is the relative movement direction of the medium 10, and along which magnetization was performed.

The MI element 12 and 22 was fabricated in the manner that a high permeability magnetic layer of Fe—Ta—C type is formed to a thickness of 2 microns on a flat rectilinear glass substrate, and, since a pattern of a single line of 3 mm in length would be of low impedance, is formed to have a pattern width of 16 microns so that four patterns were folded in parallel with each other in the shape of meandering, thereby configured in entirely straight lines combined together. The two elements were formed with a distance of 0.25 mm therebetween, and, for obtain an adequate sensitivity, a bias magnetic field of in the extent of about one gauss was applied in the longitudinal direction of the elements.

The measuring circuit is that shown in FIG. 7, in which the oscillator frequency of an external oscillator 30 to apply a high frequency current for MI elements was 20 MHz, and the gain of the differential amplifier was 750 times.

As shown in FIG. 9, the reproduced output waveform is a waveform which has alternatively a positive and a negative peak at the boundary of the line width of the printed region 14 (magnetized region). In the peak state, each of both ends of one MI element intersects the both boundaries of the line width so that the impedance change is maximum, while each end of the other element does not intersect the line width so that no impedance change occurs, thereby the differential output becomes maximum. At this time, it can be found the output of 1 volt peak to peak is obtained, and the S/N ratio is also improved, thereby the sensitivity being excellent.

As discussed above, according to the embodiment, the reproduction with the improved S/N ratio and high sensitivity is achieved.

Embodiment 3

In Embodiments 1 and 2, there is still the limitation in use with the high density recording medium. More preferably, a scheme of FIG. 10 is further suitable for use with the high density recording medium.

Figure 10:
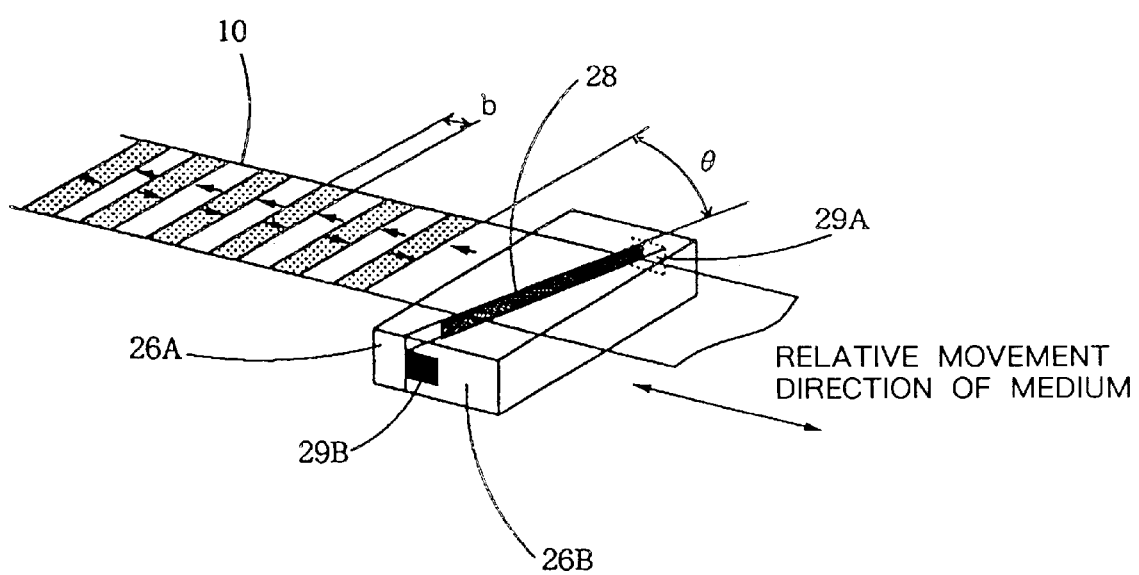
FIG. 10 is a schematic perspective view of a third embodiment.

In that shown in FIG. 10, the substrate of a magnetic head is a pair of glass substrates 26A and 26B bonded together so as to form an entirely flat rectangle. The bonded surface is formed to direct the direction normal to the surface of the recording medium 10. On one of the bonded surfaces a MI element 28 is formed as a high permeability magnetic layer, whose straight-lined edge is exposed on the surface of substrates 26A and 26B and arranged in parallel with the surface of the recording medium 10, whereby the bonded surface on which MI element is formed may also be as a surface slightly inclined from the direction normal to the surface of recording medium 10.

A pair of terminals 29A and 29B are, respectively, coupled on opposite ends of MI element 28, each being formed as a conductive thin layer on the external surface adjacent both sides of the bonded surface of substrate 26A or 26B, on which a MI element 28 is formed.

According to the aforementioned structure, the thickness of the high permeability magnetic layer of recording medium 10 of MI element 28 functions as a width for detecting a magnetic field, so that it is suitable for also reproduction from a high density recording medium. For example, even with an increased thickness of a layer such as Permalloy having a thickness of several hundreds Angstrom, by use of a material capable of exhibiting adequate magnetic characteristics, the read out is enabled even the shortest recording bit length b is lower than 1 micron.

Also in reproduction of high density recorded information, there is almost no spacing between the MI element and the recording medium, and there could be a danger of contact between these members, but, still in the present embodiment, since the width of the MI element is allowed to have several microns to several tens microns in the direction of the depth, it is possible to suspend the variation in performance due to the certain extent of wear.

Embodiment 4

Figure 11:
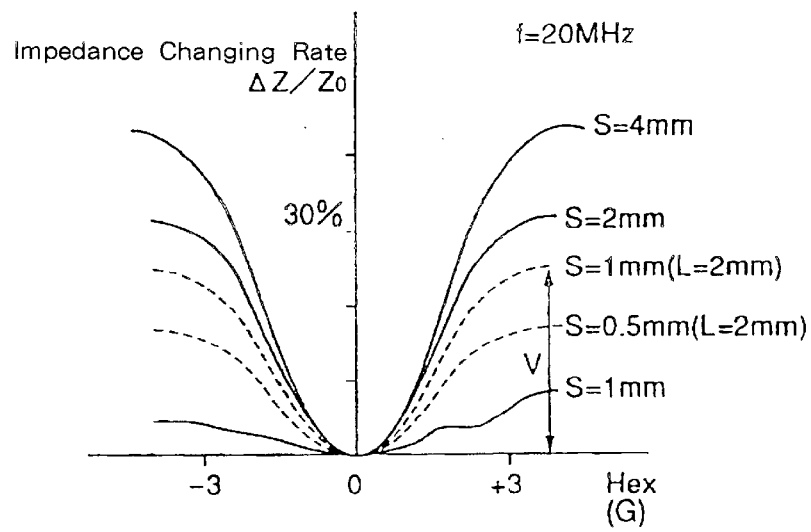
FIG. 11 is a graph illustrating the impedance changing rate according to the length S.

In the aforementioned embodiments, the track width T is narrow, and in the case to shorten the length of MI element to the extent of 1 mm, the output power is extremely low so that the operation becomes difficult to perform. FIG. 11 shows the impedance changing characteristics of a MI element 12 in the construction of FIG. 2, by changing the length S, formed of a high permeability magnetic layer of Fe—Ta—C type to a thickness of 2 microns and a width of 24 microns on a flat rectilinear glass substrate with meandering. As shown, as the length S approaches 1 mm, the characteristics rapidly decrease and finally almost no magnetic impedance effect is exhibited when reached to 1 mm.

This is because that, as the effective length of MI element is shortened, the magnetic field of the opposite direction caused by the poles produced on the ends of the magnetic material within the material is increased, and hence the magnetic field within the magnetic body decreases.

There is a measure to decrease the thickness of the magnetic layer to reduce the demagnetizing field, other than increasing the length S of the magnetic layer. The disadvantage of decreasing the thickness is that the requirement for applying a high frequency current higher than 100 MHz as the drive current for the element is caused, for the reason of further reducing the thickness of skin effect to increase the magnetic impedance effect, which is likely to lead to instability of the sensor output due to the floating capacity. Also, reducing the thickness less than or equal to 1 micron causes instability of the magnetic wall structure, and also instability of the magnetic impedance characteristics.

Figure 12:
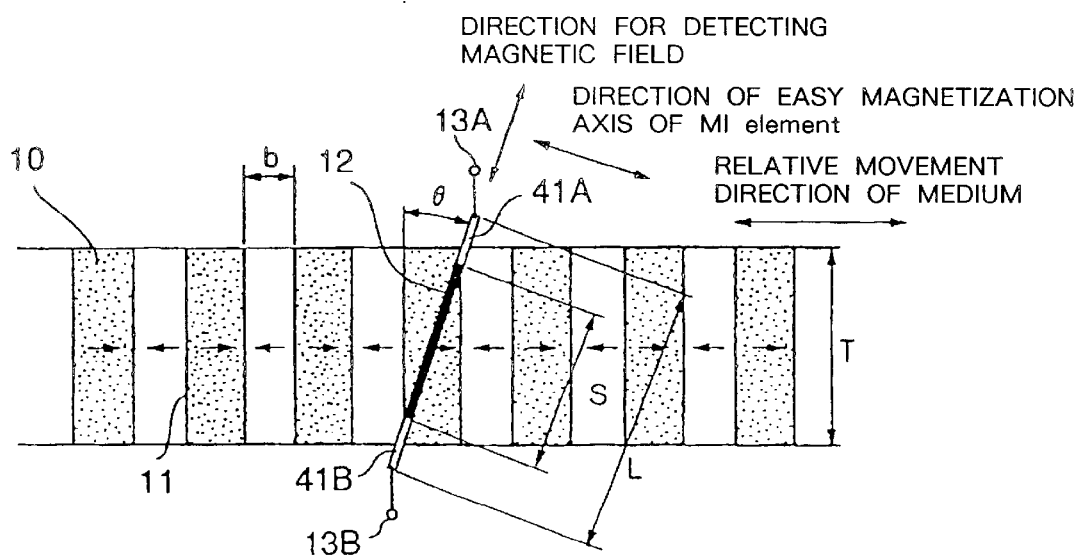
FIG. 12 is a schematic plan view of a fourth embodiment.
Figure 13:
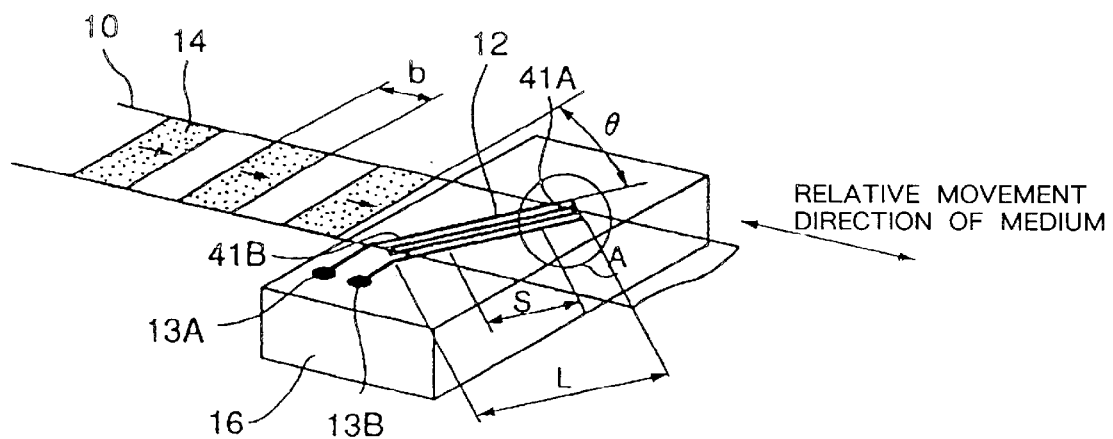
FIG. 13 is a specifically illustrating perspective view of the fourth embodiment.
Figure 14:
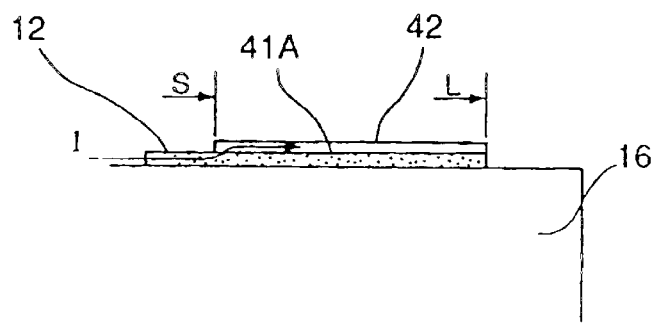
FIG. 14 is an enlarged sectional view of the section A of FIG. 13.

Therefore, in the fourth embodiment, a structure as shown in FIGS. 12 to 14 has been introduced. As shown in FIGS. 12 and 13, the entire length L of the magnetic layer forming MI element 12 shown in FIGS. 1 and 2 is increased than the length S (hereinafter, referred to "operational length") utilized to perform magnetic detection by magnetic impedance effect, and, as shown in FIG. 14, a conductive layer 42 is laminated on the upper surface of the extending region 41A (on 41B, also) of ends of the magnetic layer, by the material of copper, aluminum or gold. Such lamination of layer 42 may be also carried out on the lower surface of extending region 41A or 41B, or also may be on both the upper and lower surfaces, and the thickness thereof, although the relation with the specific resistivity of magnetic material of MI element 12 will be considered, may be preferably 0.5 to 2 microns.

The purpose of such lamination of the conductive layer 42 onto the extending regions 41A and 41B is to suspend the magnetic impedance effect in such region. Originally, by flowing a high frequency current through a magnetic material, the magnetic impedance effect is exhibited. In addition, as indicated by the arrow in FIG. 14, by flowing such a high frequency current so as to concentrate from adjacent the boundary into the conductive layer 42, this magnetic impedance effect at the extending regions 41A and 41B can be suspended.

Then, when the distance of both end poles relative to the external magnetic field is increased from S to L, the influence from the demagnetizing field is clearly improved. Such an effect is shown in FIGS. 11 and 15.

In FIG. 11, the magnetic impedance effect is represented by the dotted line, when the length S of the operational region and the entire length L of the MI element are designated such that S is 0.5 and 1 mm, and L is fixed as 2 mm. At the same time, the solid line represents the data when no lamination of the extending regions 41A and 41B is provided. As shown in FIG. 11, compared with those without the extending regions, a remarkable improvement can be seen, and, even with the length S of 0.5 mm is also in the usable range, except that the impedance changing ratio is lowered.

Figure 15:
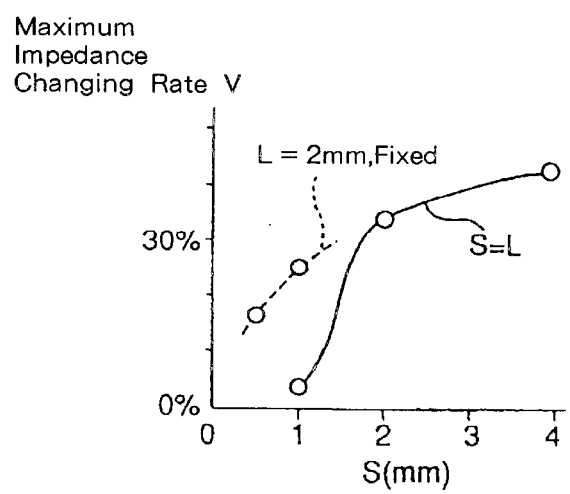
FIG. 15 is a graph illustrating the relationship of maximum impedance changing rate V with the operational length S of MI element.

On the other hand, FIG. 15 represents the relation between the maximum impedance change V and the length S of the operational region relating to MI element shown in FIG. 11. As shown in FIG. 15, in the case of the length S is lower than 2 mm, by establishing the length L as 2 mm and providing a structure of laminating a layer 42 on the extending regions 41A and 41B, the influence by the demagnetizing field is considerably suspended.

Figure 16:
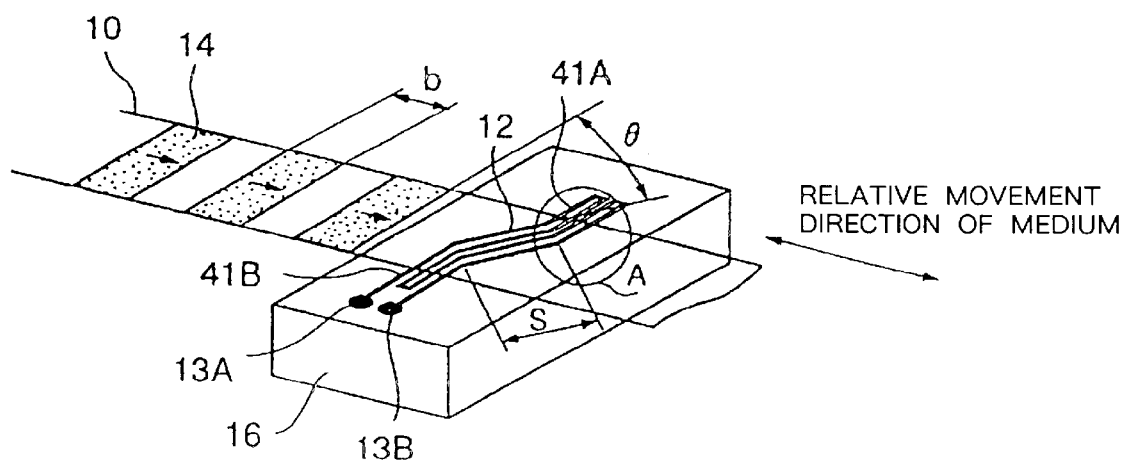
FIG. 16 is a perspective view illustrating a modification of the fourth embodiment.
Figure 17:
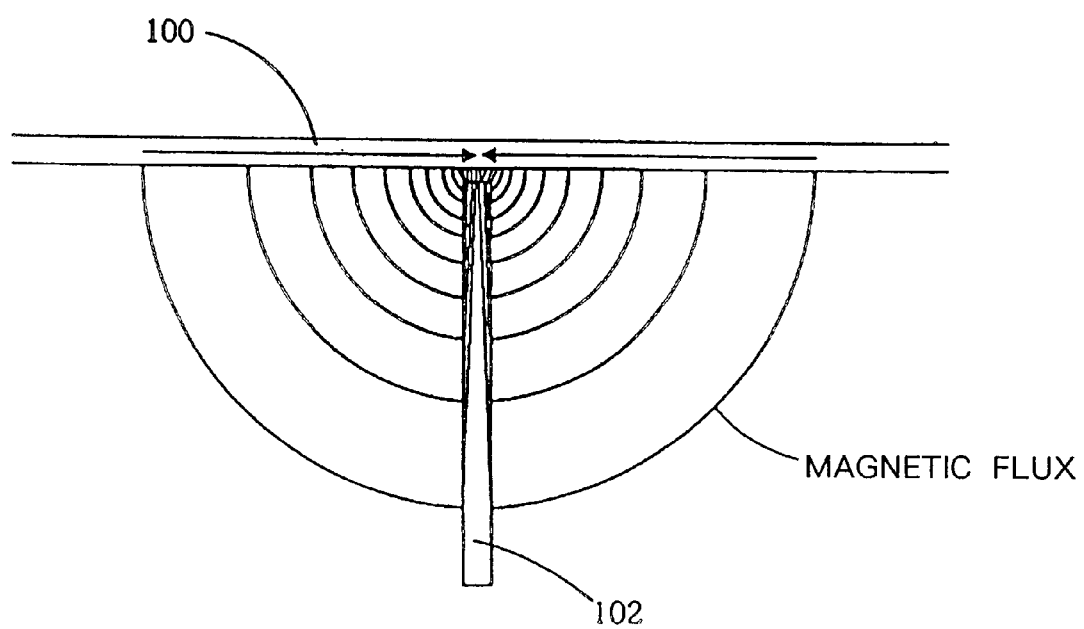
FIG. 17 is an illustrative view describing the flow of the flux from the magnetic recording medium of the arrangement according to the prior art magnetic MI element.

The extending regions 41A and 41B, the purpose of which is to suspend the demagnetizing field, may not be extended along the extending line of the operational region of length S of the magnetic material of MI element 12, and the extending regions 41A and 41B may be of having a turned portion from the boundary relative to the operational region having a length S as shown in the variation of FIG. 16.

As can be seen from the description above, the present embodiments provide a magnetic head for reproducing a digital signal from a magnetic recording medium which is magnetized discontinuously in one direction or continuously in the alternative direction, the digital signal mentioned above is reproduced from a magnetic recording medium, wherein the boundary of the adjacent oppositely magnetized regions is formed as a straight line along a direction intersecting the aforementioned relative displacement direction: and the magnetic head comprises a MI element formed as a straight line as a whole. The above-mentioned MI element is located to oppose the surface of the medium in parallel therewith, and the longitudinal portions of the element is oriented to be shifted by a predetermined angle amount with reference to the direction of magnetization of the magnetic medium, and an external magnetic field is detected using the MI element from the magnetic recording medium, thereby obtaining a reproduced signal, wherein it is possible to have the length of the MI element decreased than the shortest recording bit length of the recording medium to reduce the demagnetizing field of the element itself, and to receive the magnetic flux from the recording medium by the MI element as a whole to increase the impedance changing efficiency. Thus the magnetic impedance effect is sufficiently utilized, thereby excellent reproduction with high sensitivity, high density recording and low powered magnetic recording medium is realized.

Further, according to the embodiments, a pair of MI elements are side by side arranged away from each other by a predetermined spacing along the relative movement direction of the medium, so that the output of the MI elements are differentially amplified to produce a reproduction signal. As a result, any same-phased noise such as external noise is removed through differential amplification, thereby improving the S/N ratio.

Also, according to the embodiments, in which the entire length L of the magnetic layer forming MI element is increased than the length S utilized to perform magnetic detection by magnetic impedance effect, and a conductive layer is laminated on the extending region of ends of the magnetic layer, thereby, even the track width of the recording medium is narrow so that the length S of the magnetic layer is small, the influence by the demagnetizing field is suspended, and a sufficient output characteristic is obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetic head for reproducing a digital signal from a magnetic recording medium, said magnetic recording medium having a predetermined magnetization pattern in a relative movement direction relative to said magnetic head, and a boundary of the magnetization pattern being a straight line in the direction transverse to said relative movement direction, said magnetic head comprising:

a magnetic detecting element including a straight line portion for detecting an external magnetic field utilizing magnetic impedance effect;

wherein said straight line portion of said magnetic detecting element is located to oppose in parallel with the surface of said magnetic recording medium; and said straight line portion of said magnetic detecting element is inclined by a predetermined amount of angle with reference to the boundary of the magnetization pattern of the magnetic recording medium.

2. A magnetic head according to claim 1, wherein an angle $\theta$ is, in the relationship with a track width T of said magnetic recording medium, a length S of said magnetic detecting element and a shortest recording bit length b, combined with the following formulas:

When $T=S \cos \theta$, or $>S \cos \theta$, $L=\sin^{-1} (b/S)$. $H=\sin^{-1}(b/0.6\ S)$;

when $T<S \cos \theta$, $L=\tan^{-1} (b/T)$. $H=\tan^{-1}(b/0.6\ T)$ and, wherein said angle $\theta$ is in the range from $\theta_L$ to $\theta_H$.

3. A magnetic head according to claim 1 or 2, wherein a pair of magnetic detecting elements are arranged in parallel with each other in a relative movement direction of said magnetic recording medium by a predetermined distance; and output voltages from said magnetic detecting elements are differentially amplified to produce a reproducing signal.

4. A magnetic head according to claim 3, wherein said distance between magnetic detecting elements is equal to a shortest recording bit length of said magnetic recording medium.

5. A magnetic head according to claim 1, wherein said magnetic detecting element is formed of a high permeability magnetic material and formed on a plane extending in the direction intersecting the surface of said magnetic recording medium; and a straight lined end edge of said element is arranged to oppose in parallel with the surface of said recording medium.

6. A magnetic head according to claim 1, wherein a magnetic body forming said magnetic detecting element extends so as to have extended regions to have an entire length L which is longer than a length S for detecting a magnetic field, and, on each of said extended regions, an electroconductive layer for suspending the magnetic impedance effect is laminated.

7. A magnetic head according to claim 6, wherein said length S for detecting a magnetic field is not exceeding 2 mm, and said entire length L is not less than 2 mm.

8. A magnetic head according 6 or 7, wherein said extended region is angled toward said region having a length S from the boundary with said region.

* * * * *

UNITED STATES PATENT AND TRADEMARK OFFICE
CERTIFICATE OF CORRECTION

PATENT NO. : 5,903,414
DATED : May 11, 1999
INVENTOR(S) : Masahiro Kawase

It is certified that error appears in the above-identified patent and that said Letters Patent are hereby corrected as shown below:

Col. 3, line 25, delete "formed in a" and insert --formed as a --
Col. 3, line 26, delete "shown as" and insert -- shown in --.
Col. 7, line 17, delete "with the high" and insert -- with a high --.
Col. 7, line 16, delete "a" and insert -- the --

Signed and Sealed this

Third Day of October, 2000

Attest:

Q. TODD DICKINSON

*Attesting Officer*          *Director of Patents and Trademarks*